United States Patent
Catron

(10) Patent No.: US 7,814,936 B2
(45) Date of Patent: Oct. 19, 2010

(54) SOUND PRESSURE LEVEL FEEDBACK CONTROL

(75) Inventor: Frederick Wayne Catron, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 622 days.

(21) Appl. No.: 11/439,863

(22) Filed: May 24, 2006

(65) Prior Publication Data

US 2007/0107777 A1    May 17, 2007

Related U.S. Application Data

(60) Provisional application No. 60/737,522, filed on Nov. 16, 2005.

(51) Int. Cl.
*F16K 31/02* (2006.01)
(52) U.S. Cl. .................... 137/828; 137/2; 137/487.5
(58) Field of Classification Search ............. 137/2, 137/487.5, 828
See application file for complete search history.

(56) References Cited

U.S. PATENT DOCUMENTS

| | | | | |
|---|---|---|---|---|
| 3,851,333 | A * | 11/1974 | Fishman | 137/487.5 |
| 3,999,813 | A | 12/1976 | Whitaker | |
| 4,856,321 | A * | 8/1989 | Smalling et al. | 73/40.5 A |
| 5,409,037 | A * | 4/1995 | Wheeler et al. | 137/551 |
| 5,549,137 | A * | 8/1996 | Lenz et al. | 137/486 |
| 5,669,408 | A | 9/1997 | Nishino et al. | |
| 6,299,496 | B1 * | 10/2001 | Griffiths et al. | 440/89 R |
| 6,302,129 | B1 | 10/2001 | Van Dewerker | |
| 6,424,887 | B1 * | 7/2002 | Allaei | 700/280 |
| 7,007,545 | B1 * | 3/2006 | Martinek | 73/40.5 A |
| 7,069,950 | B1 * | 7/2006 | Bittner | 137/625.37 |
| 2001/0003286 | A1 * | 6/2001 | Philippbar et al. | 137/624.12 |
| 2004/0226614 | A1 * | 11/2004 | Lane | 137/487.5 |
| 2005/0182524 | A1 | 8/2005 | Brodeur et al. | |

FOREIGN PATENT DOCUMENTS

WO    WO-98/08150    2/1998

OTHER PUBLICATIONS

International Search Report issued in PCT/US2006/041182 dated Aug. 6, 2007.
Written Opinion of the International Searching Authority issued in PCT/US2006/041182 dated Aug. 6, 2007.
"Vibrations of Point-Drive Cylindrical Shells", Heckl, Journal of the Acoustical Society of America, vol. 34, No. 10, Oct. 1962, pp. 1553-1557.

(Continued)

*Primary Examiner*—Stephen Hepperle
*Assistant Examiner*—William McCalister
(74) *Attorney, Agent, or Firm*—Marshall, Gerstein & Borun LLP

(57) ABSTRACT

Methods and systems are provided for predicting internal sound pressure within a flow passage, by measuring a vibration velocity response of a wall of the flow passage, for example, using accelerometers. A radiation model may then be used for predicting externally radiated sound pressure to provide feedback to control a process control system. Methods and systems are also provided for predicting externally radiated sound pressure based on internally-mounted pressure transducer sensor data.

12 Claims, 3 Drawing Sheets

OTHER PUBLICATIONS

"Response of a Cylinder to Random Sound in the Contained Fluid", Fahy, J. Sound Vib. 13 (2), 1970, pp. 171-194.

"Sound Transmission Through Cylinder Walls Using Statistical Considerations", Szechenyi, Journal of Sound and Vibration 19 (1), 1971, pp. 83-94.

"Modal Densities and Radiation Efficiencies of Unstiffened Cylinders Using Statistical Methods", Szechenyi, Journal of Sound and Vibration, 19 (1), 1971, pp. 65-81.

"Theoretical and Experimental Investigation on the Effects of the Interaction Between an Acoustic Field and Cylindrical Structure on Sound Transmission Loss", Fagerlund, Ph.D. Thesis, University of Iowa, 1979, pp. 1 - 106.

"Sound Transmission Through a Cylindrical Pipe Wall", Fagerlund, ASME Paper 80-WA/NC-3 Presented at the ASME Winter Annual Meeting, Nov. 1980, pp. 1-7.

"Use of Pipewall Vibrations to Measure Valve Noise", Fagerlund, Fisher Controls International Technical Monograph 33, 1988, pp. 1-8.

"Fundamentals of Noise and Vibration Analysis for Engineers", Norton, Cambridge University Press, First Edition, 1989, pp. 385-387; "Pipe Flow Noise and Vibration: a Case Study", pp. 433-442.

"Theory and Application of Statistical Energy Analysis", Lyon et al., Second Edition, Butterworth-Heinemann, 1995, pp. 142-144.

IEC (International Electrotechnical Commission) Control Valve Standard IEC 534-8-3, "Part 8: Noise Considerations—Section 3: Control Valve Aerodynamic Noise Prediction Method", 1995, 60 pages.

* cited by examiner

SOUND PRESSURE LEVEL FEEDBACK CONTROL

CROSS-REFERENCE TO RELATED APPLICATIONS

This application claims the benefit under 35 U.S.C. §119(e) of U.S. provisional patent application Ser. No. 60/737,522, filed Nov. 16, 2005, the entire disclosure of which is incorporated herein by reference.

FIELD OF THE DISCLOSURE

The present disclosure is generally related to prediction of sound pressure levels in process control systems, and is specifically related to prediction of sound pressure levels inside flow passages and/or surrounding the flow passages, such as, for example, steel pipes, due to gaseous fluid flow within the pipes to control the process control system.

BACKGROUND

In process control systems, such as, for example, pipelines, that carry gaseous fluids, such as, for example compressed air, it is often useful to determine internal sound pressure levels. Internal sound pressure levels may be used to make transmission loss predictions, and can therefore help in the design and operation of pipelines and other process control systems.

In particular, aerodynamic noise that may be generated by control valves and propagate downstream in piping may lead to unacceptable external noise levels. Accordingly, prediction of such noise levels is important in order to ensure that such noise levels do not create undesirable or hazardous conditions, such as exceeding local, state or federal limits on radiated noise or causing hearing damage to people in the vicinity of a pipeline or structural damage to the pipeline.

Control valves may be installed in many applications involving the flow of fluids (gases or liquids) from one process to another, with the control valve commonly used to regulate the flow of fluid from one pipeline to another. A typical piping system will have a length of pipe upstream of a control valve, and a length of pipe downstream of the control valve.

The process conditions present upstream and downstream of a control valve will be dictated by various factors, such as the type of process medium that is flowing through the pipeline, the fluid dynamics of the control valve and the process control system in which it operates and for the operating conditions of the process control system. Some of the process conditions that are typically set upstream and downstream of the control valve are pressures and mass or volumetric flow rates, with the conditions downstream of the control valve being susceptible to creating undesirable noise radiating from the pipeline.

Being able to understand the transmission of sound pressure through pipe walls is an important part of predicting the sound pressure levels generated by control valves disturbing the flow and having that disturbed flow entering the downstream piping. The sound pressure level may be measured at some reference point that would be downstream of the control valve and some distance away from the pipe wall. Since the control valve will produce some level of noise, and the process plants in which they are installed typically have to comply with some overall sound pressure level regulation (e.g., OSHA regulations and/or or municipal ordinances), being able to predict the sound pressure levels radiating from piping downstream of control valves is also very important to users of process control equipment.

In particular, fluid flow downstream of a control valve may have a turbulent flow field that causes a pipe carrying the fluid to vibrate and radiate sound to the external environment.

In the past, noise predictions have been made using devices such as microphones that are placed near the flow passage of interest (e.g., in the vicinity of a pipe). Some past systems have used free field microphones external to the pipe and pressure transducers mounted internal to the pipe wall to estimate transmission losses. However, such arrangements can be expensive to install and maintain, thereby adding to the cost of an overall process control system.

Use of free field microphones and pressure transducers can be problematic in some situations, due to the cost and complexity of installing such devices. For example, installation of a pressure transducer into an internal pipe wall requires drilling a hole through the pipe wall and welding and centering the pressure transducer within the drilled hole, which may require a separate pressure-retaining fixture re-fabricated and installed on the pipeline.

There are several current methods in the literature to calculate a transmission loss value. One method that is used by control valve vendors is the International Electrotechnical Commission (IEC) method (Reference 10). The IEC control valve standard number 534-8-4 may be used to predict externally radiated noise one meter from a pipe wall, one meter downstream of the control valve outlet, and utilizes highly simplified procedures for calculating transmission loss. The IEC standard has procedures that are specifically tailored to control valve noise based on transmission loss at a single frequency, and are unsuitable for more general predictions of piping system noise. The IEC standard was largely developed for consistency in the reporting of control valve noise levels by competing vendors.

It should also be noted that IEC noise prediction only predicts one transmission loss value and internal sound pressure level at a calculated peak frequency. The transmission loss is a function of frequency and not just the peak frequency, so the IEC method will be limited when one is concerned with a frequency range.

This disclosure is directed to overcoming one or more of the problems or disadvantages associated with the prior art.

SUMMARY OF THE DISCLOSURE

In accordance with one aspect of the disclosure, internal sound pressure level of fluids such as compressed air flowing in a flow passage is predicted by measuring a wall vibration velocity response of the flow passage. The wall vibration velocity response may be measured using an accelerometer and a radiation model may be applied to predict an externally radiated sound pressure level at a specified distance away from the flow passage. The externally radiated sound pressure level may be used in a transmission loss model to predict the internal sound pressure level and control the process system externally radiated sound pressure to a predetermined level.

In accordance with another aspect of the disclosure, a method is provided for calculating the internal sound pressure level in a flow passage over a frequency range by measuring only the flow passage wall vibration velocity response, for example, using an accelerometer. After measuring the vibration velocity response, the externally radiated sound pressure level may be predicted, and then may be used to predict the internal sound pressure level by using a transmission loss model.

A method according to another aspect of the disclosure may include prediction of internal sound pressure levels over a frequency range that is accurate for the certain accelerometer that can be used.

In accordance with another aspect of the disclosure, a method of controlling a process control valve includes sensing a sound pressure level, for example, a sound pressure level interior of a flow passage, and using the internal sound pressure level to change the configuration of the process control valve to control process noise below a predetermined noise level.

In accordance with still another aspect of the disclosure, a method of controlling a process control valve includes sensing a sound pressure level, for example, a sound pressure level interior of a flow passage, determining a predicted external sound pressure, and using the determined external sound pressure level to change the configuration of the process control valve.

DETAILED DESCRIPTION

Figure 1:
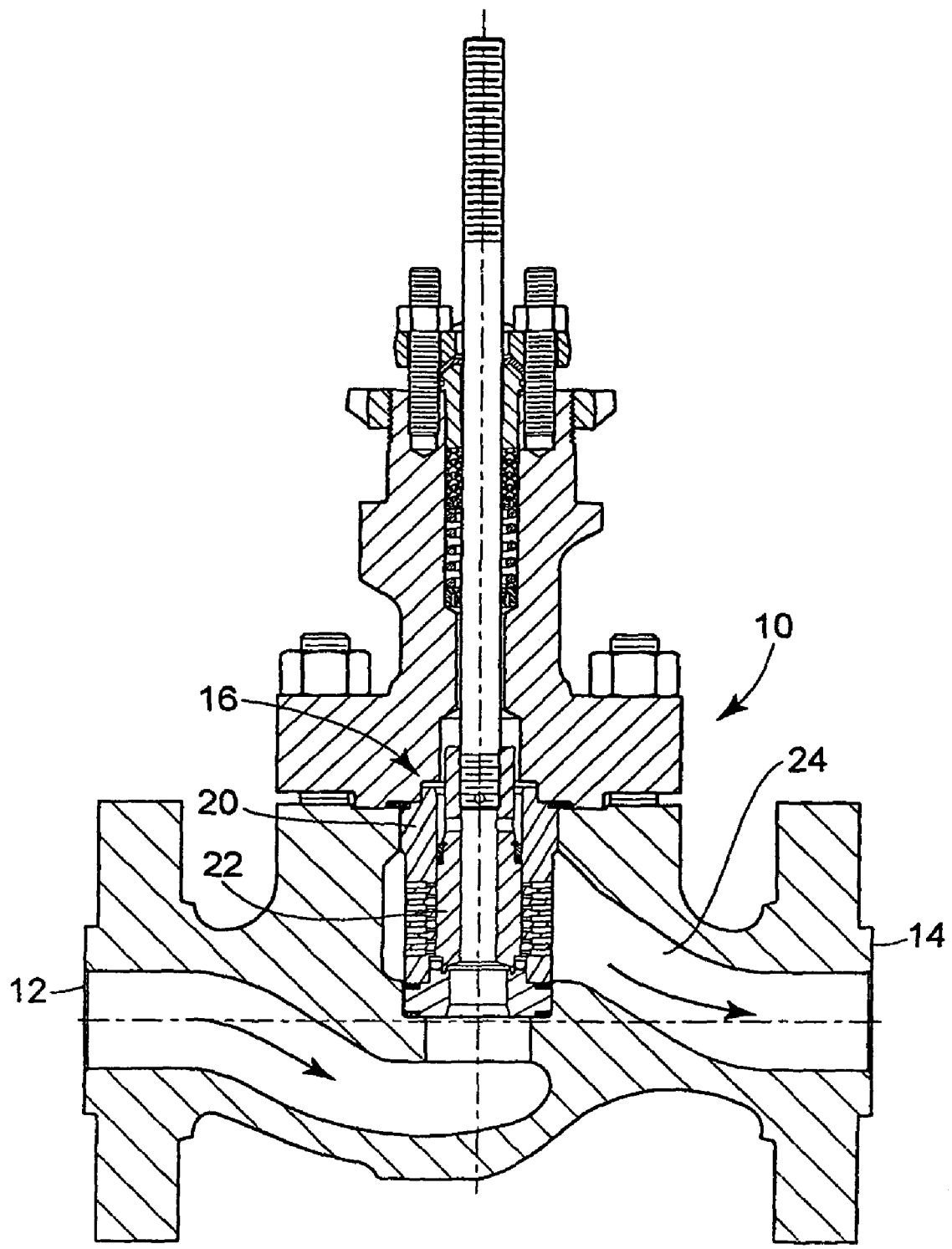
FIG. 1 is a cross-sectional diagrammatic view of a control valve body.

A cross-sectional side view of a typical globe style control valve 10 is shown in FIG. 1, with arrows showing a typical path fluid would take through the control valve 10 in a process control system (shown in FIG. 2), entering at an inlet portion 12 and exiting at an outlet portion 14. The control valve 10 may contain a cage and plug assembly 16 in an interior cavity 24 containing a cage 20 and a plug 22. The plug 22 resides inside of the cage 20 with the outside diameter of the plug 22 and inside diameter of the cage 20 providing the guiding and the shut off capability. It is generally understood that the globe style control valve 10 in FIG. 1 will permit no flow if the valve plug 22 is in a fully closed position. Alternatively, when the valve plug 22 is in a fully opened position, the control valve 10 will have the maximum open area available to the flowing medium providing the maximum flow rate through the cage and plug assembly 16, and subsequently, will have a minimum pressure drop ratio across the valve.

When the fluid exits the cage 20, the fluid enters the interior cavity 24, then exits the control valve 10 through the outlet portion 14, and enters piping 26 (FIG. 2) downstream of the control valve 10. The piping 26 may be, for example, formed from steel pipe.

Figure 2:
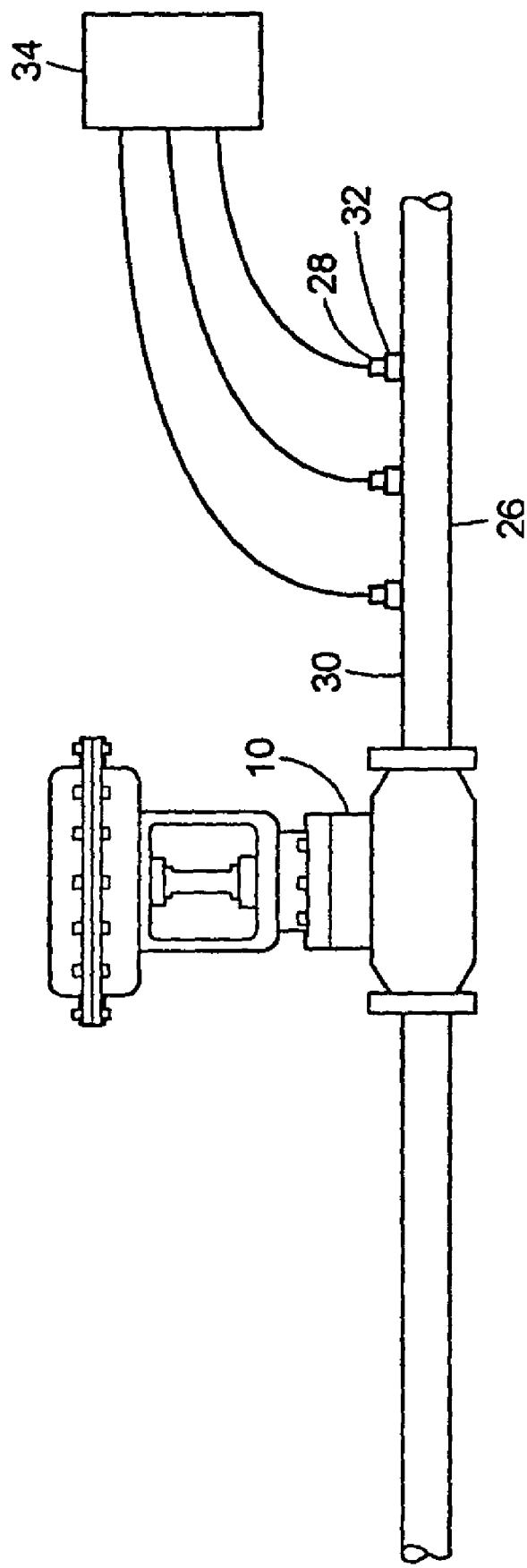
FIG. 2 is a diagrammatic side view of a control valve body and associated piping, that is instrumented in accordance with one aspect of the disclosure.

The flow of fluid that exits the control valve outlet portion 14 and enters the downstream piping 26 is typically turbulent. The turbulent flow creates pressure fluctuations, which excite vibrations in the control valve 10 and the downstream piping 26, causing the control valve body and the downstream piping 26. The vibrating downstream piping 26 has a certain pipe wall velocity, which can be quantified by instrumenting the piping 26 to detect vibrations, for example, using one or more accelerometers 28 mounted on an external pipe wall 30 using an adhesive and/or a mounting block 32, as shown in FIG. 2.

Accelerometers that are suitable for this purpose include quartz shear ICP® accelerometers, PCB model 353B16, with approximately 10 mV/g of sensitivity, and a frequency range of 1 to 10000 Hz. The accelerometers 28 may be mounted on the pipe 30 wall using an adhesive such as LOCTITE® brand adhesive.

The accelerometers 28 may be operatively connected to a computer processor 34 that may be programmed to calculate sound pressure levels as a function of accelerometer data, for example, to predict the internal sound pressure level by using a transmission loss model, using calculations set forth in further detail below. The accelerometer data may be the sole source of real-time data used by the computer processor 34 to calculate sound pressure levels.

Noise and vibration generation in pipelines typically involves a series of events. For example, once the fluid flowing through the control valve 10 exits into the downstream piping 26, the flow is somewhat disturbed causing the generation of internal acoustic pressure fluctuations by the disturbed flow of fluid, and then that flow of fluid will excite the pipe wall 30 and the pipe wall 30 will begin to vibrate due to the fluctuating internal wall pressure field. Then, the generation of external noise radiation by the pipe wall 30 will occur.

Within the vicinity of the flow disturbance being created by the cage and plug assembly 16 there may be a fluctuating pressure field. This fluctuating pressure field decays exponentially with distance from the outlet portion 14, typically falling off to a constant state after a distance of about ten pipe diameters. These fluctuating pressure levels associated with this constant state may persist for very large distances downstream from the outlet portion 14.

At the same time as the fluctuating pressure field decays, the spreading of mean flow velocity over the pipe cross section returns to its undisturbed state, indicating that the turbulence in the flow also returns to the state characteristic of undisturbed flow.

The amount of sound that is radiated from the pipe wall 30 depends on the piping material characteristics, the stiffness of the piping material, and the characteristics of the flowing medium.

In order to predict the internal sound pressure levels internal of a flow passage, such as a steel pipe, by only measuring the pipe wall velocity, a prediction of externally radiated sound pressure level may be made, and a transmission loss model may be applied to the predicted external sound pressure level to be able to predict the internal sound pressure level. Once the internal sound pressure level is predicted, a transmission loss value may then be calculated. Transmission loss is the difference between the internal sound pressure level and the externally radiated sound pressure level measured at a predetermined distance downstream of the control valve and at a predetermined distance away from the pipe wall, which is also perpendicular to the pipe wall. Transmission loss may be reported in decibels (dB) at frequencies that are of interest, and is a function of several variables. These variables have to be determined from the piping and flowing medium characteristics before transmission loss can be calculated.

The number of modes within a frequency band may also be described as modal density or mode count. Three methods have been identified for estimating a mode count, and two methods have been identified for dealing with a radiation efficiency term. The three methods for estimating the mode count will be described simply as method 1, method 2, and method 3. Method 1 is using a transmission loss equation from Fagerlund (Reference 1), estimation of the mode count from Norton (Reference 3), and estimating the radiation term from Szechenyi (Reference 6). Method 2 uses the transmission loss equation from Fagerlund (Reference 1), the estimation of the mode count from Lyon and DeJong (Reference 2), and estimating the radiation efficiency term from Szechenyi (Reference 6). Method 3 uses the transmission loss equation from Fagerlund (Reference 1), the estimation of the mode count from Szechenyi (Reference 6), and the estimation of the radiation efficiency term from Szechenyi (Reference 6).

Each of the three methods will be looked at with two different ways of dealing with the estimation of the radiation efficiency term. One method for dealing with the radiation term is from Szechenyi (Reference 6) and covers the whole frequency range. The second method of dealing with the radiation efficiency term is from Fagerlund (Reference 1), which states that above the coincidence frequency (1471 Hz) the radiation efficiency term will approach unity. Each method may be used to predict the internal sound pressure level and transmission loss and may be compared to measured values for internal sound pressure levels and transmission loss.

To develop a prediction model that would predict the internal sound pressure level by measuring the pipe wall vibration velocity response, values for the externally radiated sound pressure level from the pipe at a distance of one meter away from the pipe wall may be calculated first.

There are relationships from the literature that relate pipe wall velocity to acoustic power. Szechenyi (References 5 and 6) states that the acoustic power radiated by any structure may be expressed using a radiation resistance term and the mean square velocity of the radiating surface of a structure. Szechenyi (References 5 and 6) also states that the radiation resistance term is an acoustic damping factor that may be derived if information is known about the density, area, speed of sound, and radiation efficiency.

Fagerlund (Reference 7) states that the pressure of an acoustic wave is proportional to the particle velocity of the medium through which the wave passes and at the surface of the pipe, particle velocity is assumed equal to the velocity at which the pipe wall is vibrating.

Using the accelerometers to quantify pipe wall vibration velocity response, the externally radiated sound pressure level may be determined. From Fagerlund and Chou (Reference 4), the relationship between the velocity of the pipe wall and the acoustic pressure at a point in space, r, is $$p^2 = \rho_0^2 c_0^2 v^2 \frac{D}{2r},$$ (Equation 1)

with $p^2$ being the externally radiated sound pressure, expressed in Pascals (Pa). The ambient density is $p_0$, the ambient wave speed is $c_0$, the pipe wall velocity is v, the outside diameter of the pipe is D, and r is the radial distance to some point in space from the centerline of the pipe. By way of example, the externally radiated sound pressure level may be predicted using a radial distance of one meter. Equation 1 is the equation that may be used to predict the externally radiated sound pressure level at a distance of one meter from the pipe wall. Fagerlund and Chou (Reference 4) discussed a radiation efficiency term that was equal to unity above the coincidence frequency (8" SCH 40 pipe has an external coincidence frequency of 1471 Hz), so Equation 1 would have this radiation efficiency term at the end, but since Equation 1 is for frequencies equal to and above the coincidence frequency, the radiation efficiency term may be left out here. For the frequencies below the coincidence frequency, there is an $f/f_C$ term at the end, with f being the 1/3 octave center band frequency of interest, and $f_C$ being the coincidence frequency.

$$p^2 = \rho_0^2 c_0^2 v^2 \frac{D}{2r} \frac{f}{f_c}$$ (Equation 2)

Norton (Reference 3) describes the coincidence frequency as when the bending wave velocity in the structure equals the speed of sound in the fluid, and is calculated by Equation 4. Fagerlund (Reference 1) describes the coincident frequency as the frequency at which the intersection between the acoustic and structural wave numbers occur when looking at a wave number diagram. The maximum sound radiation should occur at the frequency that corresponds to the coincidence frequency.

$$f_c = \frac{c^2}{1.8 c_L t}$$ (Equation 3)

The coincidence frequency may also be described as a condition that allows for very efficient interaction between two structures, such as, for example, an 8" Schedule (SCH) 40 pipe and the ambient air.

Using Equations 1 and 2, the externally radiated sound pressure level may be predicted at each ⅓ Octave center band frequency, with the r term being for a location one meter from the pipe wall and perpendicular to the pipe wall.

To predict the internal sound pressure level and compare that to measured levels, an equation from Fagerlund (Reference 1). may be used. Fagerlund developed an equation that relates the mean square acoustic pressure inside the pipe to the mean square acoustic pressure outside the pipe at a given observation point r. The following equation may be used to predict the internal sound pressure levels, and thus the transmission loss, knowing the predicted external sound pressure level, $$\frac{p_0^2}{p^2} = \frac{5\rho_0^2 c_0^2 c^2 D(\Delta k_{ZS}) G(M) \sigma \sigma_0}{18 \rho_S art \omega^2 \Delta \omega (\rho c \sigma + \rho_0 c_0 \sigma_0 + t \rho_S \omega \eta_S)}$$ (Equation 4)

where $p_0$ is the external sound pressure level, and p is the internal sound pressure level. But before Equation 4 can be used, there are several other factors within Equation 4 that need to be defined and derived.

One of the terms in Equation 4 that needs to be derived is the change in axial structural wave number, the $\Delta k_{ZS}$ term in the numerator. The change in axial structural wave number will occur over a frequency band and is proportional to the number of modes within that band (Reference 1). The change in axial structural wave number can also be thought of as the number of modes within a frequency band, according to Fagerlund (Reference 1). There are three different methods of deriving the number of modes within a frequency band that may be used. The three methods are from Lyon and DeJong (Reference 2), Szechenyi (Reference 6), and Norton (Reference 3). The equation for determining the change in axial structural wave number is from Fagerlund (Reference 1). Fagerlund (Reference 1) also equates the change in axial structural wave number to the number of modes in a frequency bandwidth, $$N_S(\omega) = \Delta b = \frac{L}{\pi}\Delta k_{ZS} \qquad \text{(Equation 5)}$$

where $N_S(\omega)$ is the number of structural modes, $\Delta b$ is the change in the number of modes from the upper frequency limit to the lower frequency limit of a third octave center band, L is the length of the pipe, and $\Delta k_{ZS}$ is the change in axial structural wave number. The $\Delta b$ term may be derived using the three methods of calculating mode count that follows in the next section. Equation 5 may be used for all of the calculations using the mode count from the various methods to determine the $\Delta k_{ZS}$ value.

As noted above, the number of modes within a frequency band may also be described as modal density or mode count. The vibrational and acoustical response of structural elements, and the acoustical response of volume elements to random excitations, is often dominated by the resonant response of contiguous structural and acoustic modes (Reference 3). When some form of broadband structural excitation excites a structure, the dominant structural response is resonant; when a structure is acoustically excited, the dominant response is generally forced although it can also be resonant; and, when a reverberant acoustic volume is excited by some broadband noise source, the dominant response is resonant. It is the energy flow between resonant groups of modes that is of primary concern. The modal density is a very important parameter for establishing the resonant response of a system to a given forcing function (Reference 1).

To derive the modal densities using the methods from Norton (Reference 3), Equations 6, 7, 8, and 9 may be used. To determine which equation to use, the frequency of interest, f, over the ring frequency, $f_r$, may be calculated first. The ring frequency is defined as the frequency at which a cylinder vibrates uniformly in the breathing mode, and may be calculated by $$f_r = \frac{c_L}{2\pi a_m} = \frac{1}{2\pi a_m}\left\{\frac{E}{\rho(1-v^2)}\right\}^{1/2}, \qquad \text{(Equation 6)}$$

where $a_m$ is the mean shell radius, E is the modulus of elasticity, $c_L$ is the longitudinal wave speed for the piping material, and v is Poisson's ratio. The breathing mode is defined as the first mode of a cylinder in which the radius of the cylinder expands and contracts, all parts of the cylinder moving inward or outward at the same rate.

For an $f/f_r$ term of less than or equal to 0.48, the mode count would be $$n(f) = \frac{5S}{\pi c_L t}\left(\frac{f}{f_r}\right)^{1/2} \qquad \text{(Equation 7)}$$

where S is the surface area of the pipe. When the $f/f_r$ term is greater than 0.48 and less than or equal to 0.83, the mode count will be $$n(f) = \frac{7.2S}{\pi c_L t}\left(\frac{f}{f_r}\right). \qquad \text{(Equation 8)}$$

When the $f/f_r$ term is greater than 0.83, the mode count will now be $$n(f) = \frac{2S}{\pi c_L t} \qquad \text{(Equation 9)}$$
$$\left[2 + \frac{0.596}{F-1/F}\left\{F\cos\left(\frac{1.745 f_r^2}{F^2 f^2}\right) - \frac{1}{F}\cos\left(\frac{1.745 F^2 f_r^2}{f^2}\right)\right\}\right]$$

For Equations 6, 7, 8, and 9, S is the surface area of the cylinder, for example the downstream pipe from an 8"×6" EW control valve from Fisher Controls International LLC, St. Louis, Mo. Also for Equations 6, 7, 8, and 9, t is the pipe wall thickness, F is the frequency bandwidth factor ({upper frequency/lower frequency}$^{1/2}$), and $c_L$ is the longitudinal wave speed for the piping material. For one-third octave bands, F=1.122. From Norton (Reference 3), it is stated that Equations 7, 8, and 9 do not account for the grouping of circumferential modes in cylindrical shells at frequencies below the ring frequency, which for 8" SCH 40 pipe is 7835 Hz. This could be one reason why Equations 7, 8, and 9 may tend to under-predict the mode count.

To derive modal densities, or mode count, using the methods outlined by Lyon and DeJong (Reference 2), the following equations may be used. Lyon and DeJong state that the cylinder mode count changes character around the ring frequency, with the ring frequency being defined by Equation 6 previously. For the frequency range $f \gg f_r$, the mode count is approximated by $$N_C(f \gg f_r) = \frac{L}{2\kappa}\frac{f}{f_r} = \frac{\pi r L f}{\kappa c_L} \qquad \text{(Equation 10)}$$

where NC is the mode count, L is the length of the pipe in question, is $\kappa$ the radius of gyration for bending in the cylinder wall ($\kappa = h/\{(12)^{1/2}\}$ for a uniform thickness h), r is the external radius of the pipe, f is the frequency of interest, and $c_L$ is the longitudinal wave speed. For the frequency range of f<fr, the mode count is approximated $$N_C(f < f_r) = \frac{L}{2\pi\kappa}\frac{f}{f_r}\left(\sin^{-1}\sqrt{f/f_r} + \sqrt{f/f_r}\right). \qquad \text{(Equation 11)}$$

In Lyon and DeJong (Reference 2), it is stated that because of the discontinuity in the cylinder mode counts around $f=f_r$, it is convenient to use a smooth curve fit to Equations 10 and 11 before evaluating a modal density. One form, which is valid over the entire frequency range, is $$N_C \cong \frac{L}{2\kappa}\frac{f}{f}\left\{1 + \left[\frac{\pi/2}{\sqrt{f/f_r} + 1/2(f/f_r)^{3.5}}\right]^4\right\}^{-1/4}. \qquad \text{(Equation 12)}$$

The third method used in evaluating the mode count is from Szechenyi (Reference 6). Szechenyi has three equations that were offered and may be used to describe the modal densities of cylinders with a fair degree of accuracy and simplicity. The three equations are listed below. For a value of $v_0$ which is less than or equal to 0.48, the mode count is estimated by $$B = 2.5\sqrt{v_0} \qquad \text{(Equation 13)}$$

where $v_0$ is the center band frequency divided by the ring frequency. For values of $v_0$ which were greater than 0.48 but less than or equal to 0.83, the mode count is estimated by $$B = 3.6 v_0. \quad \text{(Equation 14)}$$

Szechenyi (Reference 6) states that Equations 13 and 14 may be assumed common to all frequency bandwidths since for $v_0 \leq 0.83$ there is very little difference between modal densities for the different bandwidths. When the values of $v_0$ are greater than 0.83, the mode count may be estimated by $$B = 2 + \frac{0.23}{(F - 1/F)} \left[ F \cos\left(\frac{1.745}{F^2 v_0^2}\right) - \frac{1}{F} \cos\left(\frac{1.745 F^2}{v_0^2}\right) \right] \quad \text{(Equation 15)}$$

where F is the frequency bandwidth factor described above.

Mode count values may be derived using three methods and the equations from those methods and substituted into Equation 4 for the axial structural wave number term, $\Delta k_{ZS}$, since the change in axial wave number over a frequency band may be considered proportional to the number of modes within that frequency band (Reference 4).

There is a term in the numerator of Equation 4 that accounts for flow velocity in the piping downstream of the 8"×6" EW control valve. The velocity correction factor, G(M), is a term used to account for the effect of uniform flow and is used for analysis of subsonic flows (Reference 1). The velocity correction factor is calculated by $$G(M) = \frac{12}{M^3} \left( \frac{1 + M}{2 + M} \right) \left[ \frac{M(2 - M)}{2(1 - M)} + \ln(1 - M) \right] \quad \text{(Equation 16)}$$

where M is the Mach number downstream of the control valve. Reference (Reference 1) has velocity correction factors for upstream and downstream flow velocities up to Mach 0.7.

Another term that needs to be defined in Equation 4 is the radiation efficiency term, σ, for conditions existing internally and externally. In Equation 4, the internal radiation efficiency term is σ, and the external radiation efficiency term is $σ_0$. From Fagerlund (Reference 7), the radiation efficiency may be defined as the ratio of the actual acoustic power to the ideal acoustic power, $W_A/W_I$, and describes the coupling between a structure and an adjacent pressure field. The equation for the $W_A$ term, the actual acoustic power, is $$W_A = \frac{2\pi L p^2}{\rho_0 c_0} \quad \text{(Equation 17)}$$

where L is the length of the pipe, $p^2$ is the RMS acoustic pressure, $p_0$ is the density of air outside the pipe, and $c_0$ is the ambient wave speed. The equation for the $W_I$ term, the ideal acoustic power, is $$W_I = \pi D L \rho_0 c_0 v^2 \quad \text{(Equation 18)}$$

where D is the diameter of the pipe in question and v is the RMS wall velocity. Both Equation 17 and 18 have units of watts, which is a common unit used to describe acoustic power. Using the prior definition of radiation efficiency being the ratio of the actual acoustic to the ideal acoustic power, the calculated values for the radiation efficiency term approach zero below the coincidence frequency, and become unity above the coincidence frequency, which gives good agreement with what is described in (Reference 4). From Fagerlund (Reference 1), it has been shown by many investigations that the radiation efficiency near the coincidence point is unity and falls off rapidly enough below this frequency to be considered zero.

Szechenyi (References 5 and 6) also defines an external and internal radiation efficiency term using statistical methods. Szechenyi (Reference 6) defines the external and internal radiation efficiency to be approximately equal to each other when averaged over a number of modes and the radiation efficiency term rapidly converges to unity as the structural and acoustic wave number are increasingly dissimilar so that an average value of 1 is reasonable. In Szechenyi (Reference 6), there is a method by which one could calculate the radiation efficiency term only if the modal density function is derived from Szechenyi (Reference 6). Using the equations outlined in (Reference 6) and the modal density function value from Szechenyi (Reference 6), the radiation efficiency term seems to be approaching zero below the coincidence frequency and approaches values greater than one when the frequencies are above the coincidence frequency. The equations are based on structural and acoustic wave number diagrams for third octave frequency bands of cylinders. From the wave number diagrams, equations are defined so one could calculate a radiation efficiency term. Some of the variables in the Area equation refer to lines and areas on the wave number diagram in Szechenyi (Reference 6). To calculate the radiation efficiency value, differences in areas on the diagrams leads to an Area that is used in the radiation efficiency equation. The Area equation is $$\text{Area} = \frac{1}{2} OF(DF - EF) \quad \text{(Equation 19)}$$

where OF describes a value for a kC, which is a point of intersection called C on a figure outlined in Szechenyi (Reference 6). Likewise, DF and EF are lines that describe areas in the same diagram. The equations for the values of OF, DF, and EF are listed below.

$$OF = v_0 (f_R / f_C)^{1/2} \left\{ 1 - v_0 [1 - v_0 (f_R / f_C)^2]^{1/2} \right\}^{1/2} \quad \text{(Equation 20)}$$

$$DF = OF \left( \frac{v_0 F}{1 - v_0 F} \right)^{1/2} \quad \text{(Equation 21)}$$

$$EF = OF \left( \frac{v_0 / F}{1 - v_0 / F} \right)^{1/2} \quad \text{(Equation 22)}$$

In Equations 20, 21, and 22, F is the frequency bandwidth factor (which for third octave bands is 1.122), and $v_0$ is the ratio of the center band frequency over the ring frequency. After the equations are solved for OF, DF, and EF, the Area equation can be solved. Using the value calculated in the Area equation, the radiation efficiency equation can be solved. The radiation efficiency equation is $$\sigma = \frac{\text{Area}(12(1 - \mu^2))^{1/2}}{B(F - 1/F) v_0}. \quad \text{(Equation 23)}$$

where B is the modal density function described in Equations 13, 14, and 15, μ is poisons ratio, $v_0$ is the ratio of the center band frequency to the ring frequency, and F is the bandwidth factor described before. According to (Reference 6), Equation 23 is valid over a certain limit of $v_0$ and the ratio of ring frequency to coincidence frequency, and when those two values are small, Equation 23 will simplify and the radiation efficiency term is calculated by $$\sigma = \frac{v_0^{3/2} f_R f_C}{2B} \left[ \frac{F^{1/2} - (1/F)^{1/2}}{F - 1/F} \right] [12(1 - \mu^2)]^{1/2} \quad \text{(Equation 24)}$$

where $f_R$ is the ring frequency and $f_C$ is the coincidence frequency. If only bandwidths of third octave or narrower are going to be considered, Equation 24 will further simplify into $$\sigma \cong \frac{v_0^{3/2} (f_R / f_C)}{4B} \times [12(1 - \mu^2)]^{1/2}. \quad \text{(Equation 25)}$$

Furthermore, Szechenyi (Reference 6) points out that Equation 25 will be confined to the frequency region where the first approximation of B applies, and thus for values below the limits for $v_0$ and the ratio $f_R/f_C$ the radiation efficiency can be solved by using the following equation.

$$\sigma \cong 0.346 (1 - \mu^2)^{1/2} v_0 (f_R / f_C) \quad \text{(Equation 26)}$$

Equation 26 is one of the methods that may be used in Equation 4 for the calculation of internal pressure to see how it compares to the previous method of determining the radiation efficiency from Fagerlund (Reference 1).

The last term that needs description in Equation 4 is the variable $\eta_s$, the material loss factor. The material loss factor may be treated as being a constant, with the value being $10^{-4}$. However, the material loss factor could range from a value of from about $10^{-4}$ to about 0.01. This application will not get into evaluating the material loss factor and the value of $10^{-4}$ may be used for all calculations.

All of the variables for Equation 4 have been defined, and the internal sound pressure level may now be predicted. One method by which sound pressure level may be predicted is by calculating the externally radiated sound pressure from Equation 1 for all the third octave center band frequencies first, then the variables that are unknown in Equation 4, the mode count and radiation efficiency, may be calculated using the different methods outlined previously. Equation 4 may then be solved, and the internal sound pressure level may be predicted, the transmission loss may be predicted, and those values may be compared to the measured values at each third octave center band frequency, e.g., for system calibration purposes.

One method of estimating a mode count using an algebraic function is provided by Heckl (Reference 9). Heckl (Reference 9) proposes use of a simple shell model in order to get simple formulas for modal density and resonant frequencies. Norton (Reference 3), Lyon & DeJong (Reference 2), and Szechenyi (References 5 and 6) detail methods that can estimate the modal density for certain frequency ranges, with Szechenyi (References 5 and 6) also providing a method for estimating the radiation efficiencies.

Of all of these methods for calculating the transmission loss, it is believed that absolute pipe transmission losses can be best obtained through extensive calculations using equations from Fagerlund (Reference 1) or Norton (Reference 3).

Figure 3:
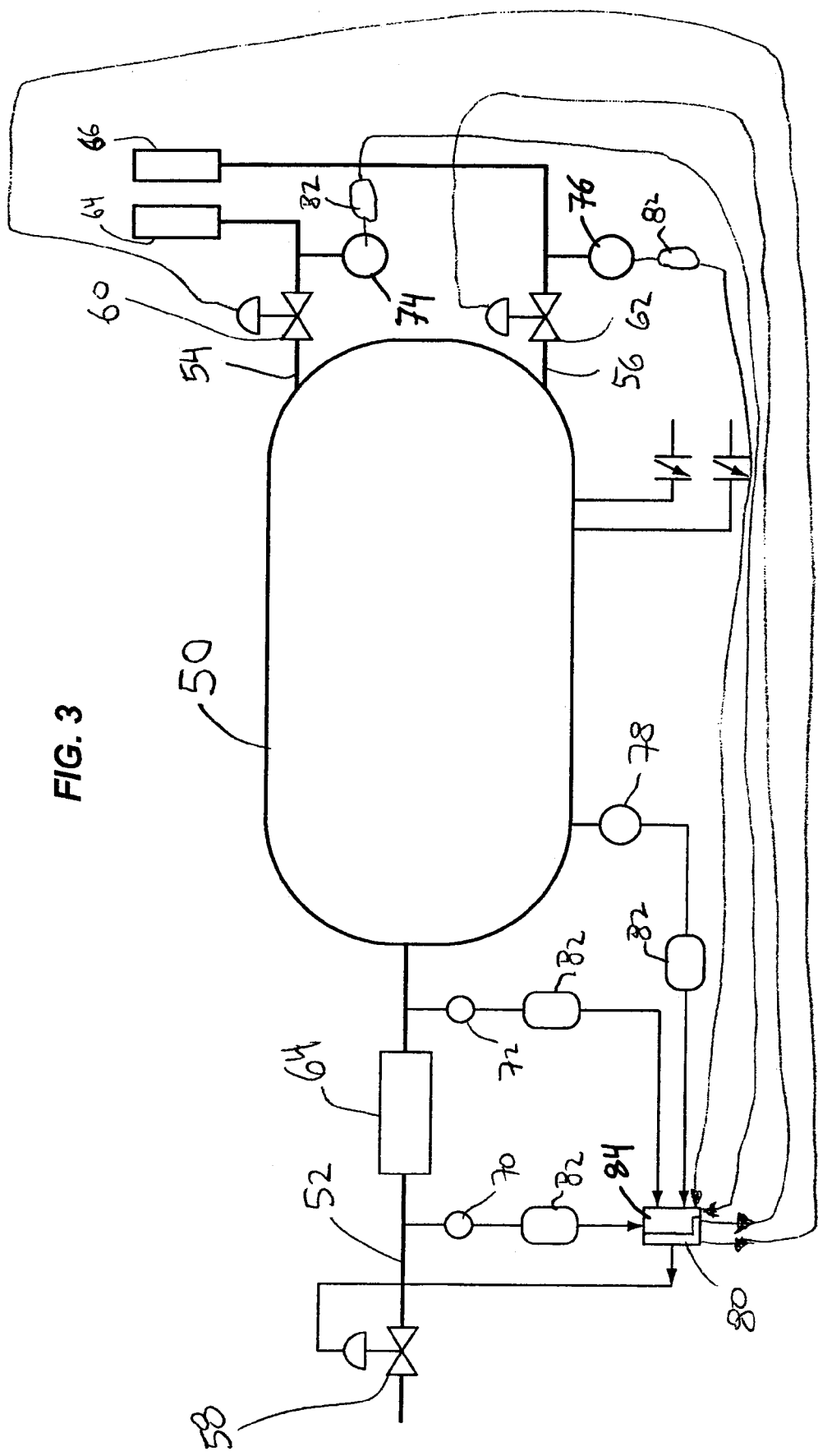
FIG. 3 is a schematic view of an autoclave and associated process control devices associated therewith, configured in accordance with another aspect of the disclosure.

With reference to FIG. 3, an exemplary apparatus illustrating another aspect of the disclosure shown in schematic form. An autoclave 50 is in fluid communication with a fill line 52 for pressurizing the autoclave 50. For venting the autoclave 50 a first vent line 54 and a second vent line 56 may be provided. The flow of fluid within the fill line 52 may be regulated using a fill line control valve 58, and similarly, the flow within the first and second vent lines 54 and 56 may be regulated using a first vent line control valve 60 and a second vent line control valve 62, respectively. A fill line silencer 64 may be provided in-line with the fill line 52, and first and second vent line silencers 66 and 68 may be provided in-line with the vent lines 54 and 56, respectively.

A first fill line sound pressure transducer 70 may be provided upstream of the fill line silencer 64 and a second fill line sound pressure transducer 72 may be provided downstream of the fill line silencer 64. Each of the first and second fill line sound pressure transducers 70 and 72 may be mounted flush with an interior surface of the piping of the fill line 52. Similarly, first and second vent line sound pressure transducers 74 and 76 may be mounted flush with an interior piping surface of each of the vent lines 54 and 56, respectively. In addition, an autoclave pressure/temperature sensor 78 may be provided on an interior surface of the autoclave 50. Each of the pressure transducers, 70, 72, 74, and 76 may be operatively connected to a digital valve controller 80, for example, via analog to digital converters 82, and the autoclave pressure/temperature sensor 78 may also be operatively connected to the digital valve controller 80 via an analog to digital converter 82. Each of the control valves 58, 60, and 62 may be operatively connected to the digital valve controller 80, in order to receive command signals from the digital valve controller 80.

In operation, sound pressure level readings from the sound pressure transducers 70, 72, 74, and/or 76, and optionally from the autoclave pressure/temperature sensor 78, may be obtained. The digital valve controller 80 may be programmed to use sound pressure level readings as feedback control parameters to adjust valve travel of the fill line control valve 58, as well as the first vent line control valve 60 and the second vent line control valve 62, in order to maintain noise levels external to the fill line 52 and the vent lines 54 and 56 at acceptable levels. For example, the radiated sound pressure level at locations approximately one meter away from the pipe walls of the fill line 52 and the vent lines 54 and 56 may be maintained to be at or below 80 decibels.

For applications in which the autoclave 50 is large, for example, on the order of 50,000 cubic feet, pressurizing the autoclave 50 with gas, such as for example, nitrogen gas, to a operating pressure of, for example, 150 psig, may require use of fluid pressures on the order of 300 to 500 psig upstream of the fill line control valve 58. During such a pressurization process, the upstream and downstream pressures could create a situation in which it would be likely for a very high pressure drop ratio to occur if the fill line control valve 58 were to be opened too quickly. This would result in a sound pressure level that would likely exceed acceptable limits, such as for example 80 dB, one meter away from the pipe wall of the fill line 52.

Similarly, when the autoclave needs to be vented, the vent lines 54 and 56 need to vent the autoclave from an operating pressure of, for example, 150 psig, to ambient pressure, relatively quickly, e.g., in less than fifteen minutes, while still maintaining acceptable noise levels one meter from the pipe wall. Accordingly, by using pressure transducer readings as feedback control parameters in order to ensure valve configurations that will not cause high noise levels, and so that the autoclave 50 can be pressurized and vented in an efficient manner.

The sound pressure transducers 70, 72, 74, and 76 may be, for example, pressure transducers available from PCB Piezotronics, Inc. as Model 106B. The digital valve controller 80 may include a digital signal processing (DSP) module 84, which may be pre-configured, or configured on the fly (i.e., in real time) to analyze the input signal received from each of the sound pressures transducers 70, 72, 74, and 76, analyze the signal in some sort of octave band such as, for example, ⅟₁, ⅓, ⅟₁₂, or ⅟₂₄ octave, calculate an internal sound pressure level for each octave band over a pre-specified frequency range, and use the internal sound pressure level in a transmission loss model. Such calculations may require the DSP module 84 to also receive inputs from other sensors such as pressure and/or temperature sensors as well as inputs relating to pipe wall schedule, ambient conditions, and other inputs. From all these inputs, the DSP module 84 may calculate an externally radiated sound pressure level at certain pre-specified distances. With this calculated sound pressure level, the digital valve controller 80 may send appropriate command signals to position valve travel of the fill line control valve 58, the first vent line control valve 60, and/or the second vent line control valve 62 to ensure a pre-specified sound pressure level is not exceeded.

Also, pipe wall vibration velocity responses may be calculated or sensed using accelerometers in order to predict acoustic fatigue, to predict wear for maintenance purposes, and/or in liquid applications, to predict cavitation and modulate valve travel accordingly. Cavitation information also could be used to determine a predictive maintenance schedule, and excessive cavitation levels could be tracked, for example, to provide a basis for denying warrantee coverage for failures related to excessive cavitation.

In addition, data gathered by the digital valve controller 80 may be used for purposes of performing frequency spectrum analysis remotely.

As a further alternative, multiple digital valve controllers could be operatively connected to one or more digital signal processing modules, in order to adjust one or more of the process control valves associated with each of the digital valve controllers in order to maintain noise at acceptable levels, for example at a fence line. There could be one main DSP gathering information from all other DSPs and performing calculations treating all noise sources as point sources, dipole sources, or any other pre-specified noise model, and sending back a signal to various digital valve controllers to indicate that one or more valves needs to be modulated, for example 10% down in travel, in order to achieve acceptable noise levels. Such an arrangement may also include additional pipe lines and valves for times where heavy loads are needed but noise levels are not to be exceeded.

It should be noted that the communication among sensors, digital valve controllers, and/or digital signal processing modules may be wired or wireless, and the sensors may be powered by any appropriate means, such as, for example, with the use of batteries.

The use of accelerometers to obtain the internal sound pressure level will eliminate or reduce the need for costly maintenance and calibration of free field microphones. It will also eliminate the need for costly fabrication of fixtures, maintenance, and calibration of pressure transducers that are used to measure the internal sound pressure levels. The method will also allow faster acquisition of testing data. In the field at a process facility, the internal sound pressure level information can be obtained more accurately by measuring the pipe wall vibration velocity response, since trying to apply a transmission loss model to measurements with a free field microphone could be subject to errors, for example, due to multiple noise sources impacting the free field microphone measurements.

REFERENCES

A. C. Fagerlund, "A Theoretical and Experimental Investigation on the Effects of the Interaction Between an Acoustic Field and Cylindrical Structure on Sound Transmission Loss", Ph.D. Thesis, University of Iowa, 1979.

R. H. Lyon and R. G. DeJong, Theory and Application of Statistical Energy Analysis, Second Edition, Butterworth-Heinemann, 1995.

M. P. Norton, Fundamentals of Noise and Vibration Analysis for Engineers, First Edition, Cambridge University Press, 1989.

A. C. Fagerlund & D.C. Chou, "Sound Transmission Through a Cylindrical Pipe Wall", ASME Paper 80-WA/NC-3 presented at the ASME Winter Annual Meeting, November 1980.

E. Szechenyi, "Sound Transmission Through Cylinder Walls Using Statistical Considerations", Journal of Sound and Vibration (1971) 19 (1) 83-94.

E. Szechenyi, "Modal Densities and Radiation Efficiencies of Unstiffened Cylinders Using Statistical Methods", Journal of Sound and Vibration (1971) 19 (1) 65-81.

A. C. Fagerlund, "Use of Pipewall Vibrations to Measure Valve Noise", Fisher Controls International Technical Monograph 33.

Fahy, F. J., "Response of a Cylinder to Random Sound in the Contained Fluid", Journal of Sound and Vibration (1970) 13 (2), 171-194.

Heckl, M., "Vibrations of Point Driven Cylindrical Shells", Journal of the Acoustical Society of America, 1962, 34 (10), 1553-1557.

IEC (International Electrotechnical Commission) Control Valve Standard IEC 534-8-3, "Part 8: Noise Considerations—Section 3: Control Valve Aerodynamic Noise Prediction Method" (1995).

While the present invention has been described with reference to specific exemplary embodiments, which are intended to be illustrative only and not to be limiting of the invention, it will be apparent to those of ordinary skill in the art that changes, additions and/or deletions may be made to the disclosed embodiments without departing from the spirit and scope of the invention. Accordingly, the foregoing description is given for clearness of understanding only, and no unnecessary limitations should be understood therefrom, as modifications within the scope of the invention may be apparent to those having ordinary skill in the art.

What is claimed is:

1. A method of controlling a valve in a process control system, comprising;

providing a sound pressure transducer;

positioning the sound pressure transducer within a flow passage associated with the valve;

using the sound pressure transducer to sense a sound pressure level inside of the flow passage associated with the valve;

providing a valve controller operatively coupled to the valve and including a processor operatively coupled to the sound pressure transducer;

providing data indicative of the sensed sound pressure level to the processor;

using the processor to predict an externally radiated sound pressure level based on the internally sensed sound pressure level; and using the predicted externally radiated sound pressure level as a feedback parameter in a control system that adjusts a configuration of the valve to maintain noise levels at or below a predetermined maximum noise level.

2. The method of claim 1, wherein the pressure transducer is mounted to an interior wall of the flow passage.

3. The method of claim 1, wherein the processor is programmed to predict the externally radiated sound pressure level using a transmission loss model.

4. A method of controlling noise associated with a valve used for pressurizing a pressure vessel during a pressurization process, the method including:

providing a fill line supplying pressurized fluid to a pressure vessel;

providing a fill line control valve to regulate the flow of fluid within the fill line;

providing at least one sound pressure transducer downstream of the till line control valve;

positioning the at least one sound pressure transducer within the fill line;

using the at least one sound pressure transducer to sense a sound pressure level inside of the fill line;

providing a valve controller operatively coupled to the fill line control valve and including a processor operatively coupled to the at least one sound pressure transducer;

providing data indicative of the sensed sound pressure level to the processor;

using the processor to predict an externally radiated sound pressure level based on the internally sensed sound pressure level; and using the predicted externally radiated sound pressure level as an input to the valve controller in order to control valve travel of the fill line control valve to pressurize the pressure vessel while maintaining noise levels at or below a predetermined maximum noise level.

5. The method of claim 4, further including providing at least one silencer in the fill line.

6. The method of claim 4, wherein the at least one sound pressure transducer is disposed downstream of the at least one silencer.

7. The method of claim 4, wherein the processor is programmed to predict the externally radiated sound pressure level using a transmission loss model.

8. A system for controlling, noise associated with a valve used for pressurizing a pressure vessel during a pressurization process, the system including:

a fill line supplying pressurized fluid to a pressure vessel;

a fill line control valve to regulate the flow of fluid within the fill line;

at least one sound pressure transducer positioned within the fill line and downstream of the fill line control valve, wherein the at least one sound pressure transducer senses a sound pressure level inside of the fill line;

a digital valve controller operatively coupled to the fill line control valve and including a processor operatively coupled to the at least one sound pressure transducer, wherein data indicative of the sensed sound pressure level is provided to the processor;

wherein the processor predicts an externally radiated sound pressure level based on the sensed sound pressure level; and wherein the predicted externally radiated sound pressure level is an input to the valve controller in order to control valve travel of the fill line control valve to pressurize the pressure vessel while maintaining noise levels at or below a predetermined maximum noise level.

9. The system of claim 8, wherein the processor is programmed to predict the externally radiated sound pressure level using a transmission loss model.

10. A system for controlling the flow of a fluid through a control valve, the system comprising:

a control valve;

a first fluid passage in fluid communication with the control valve, upstream of the control valve;

a second fluid passage in fluid communication with the control valve via a pipe having a wall, the second fluid passage disposed downstream of the control valve;

a sound pressure transducer mounted to the wall within the pipe associated with the second fluid passage, the sound pressure transducer arranged to output data indicative of a sensed sound pressure level within the pipe; and a valve controller operatively connected to the control valve and comprising a computer processor operatively coupled to the sound pressure transducer, the computer processor programmed to predict an externally radiated sound pressure level as a function of the sound pressure transducer data, wherein the valve controller is programmed to change a configuration of the control valve based at least in part on the predicted sound pressure level.

11. The system of claim 10, wherein the computer processor is included in a digital signal processing module that is programmed to calculate an externally radiated sound pressure level using inputs from the sound pressure transducer.

12. The system of claim 11, wherein the digital signal processing module is programmed to calculate the externally radiated sound pressure level using a transmission loss model.

* * * * *